June 23, 1970  L. J. WOLF  3,516,521

VEHICLE BRAKE ACTUATOR

Filed Oct. 7, 1968  2 Sheets-Sheet 1

INVENTOR
LLOYD J. WOLF
BY
*Bedell & Burgess*
ATTORNEYS

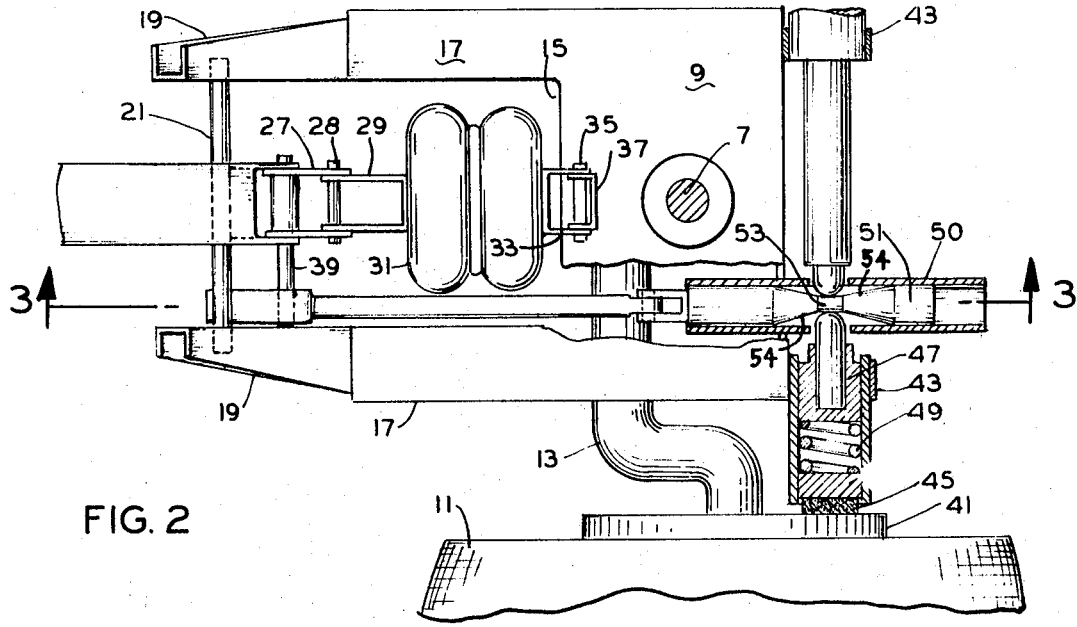

United States Patent Office 3,516,521
Patented June 23, 1970

3,516,521
VEHICLE BRAKE ACTUATOR
Lloyd J. Wolf, 2425 Irving Blvd., Dallas, Tex. 75207
Filed Oct. 7, 1968, Ser. No. 781,293
Int. Cl. B60k 7/20
U.S. Cl. 188—119                                                 9 Claims

ABSTRACT OF THE DISCLOSURE

A brake actuator for trailing vehicles such as four-wheel baggage trucks of the type used at railroad stations and airports, includes a cam movable lengthwise of the vehicle, a transverse depression in the cam, a follower normally seated in the depression and movable transversely outwardly of the vehicle upon longitudinal movement of the cam from its centered position, a lost motion connection between the cam and the vehicle tongue, such that when the tongue is moved to an upright position it will pull the cam forward, thereby urging the follower outwardly into brake setting position, or if the tongue drops to the ground, it will push the cam rearward to set the brake, and if the tractor and/or preceding trailer decelerates, the tongue will be pushed rearwardly, as permitted by a lost motion slot in it, causing the tongue to push the operating cam rearward, thus setting the brake.

BACKGROUND OF THE INVENTION

Field of the invention

The invention relates to vehicle brakes and consists particularly in a brake actuator for trailing vehicles which is actuable responsive to movements of the tongue rearwardly or to an upright position or to a dropped position.

Description of the prior art

Prior art disclosures show baggage trucks, wagons and the like with tongue operated front wheel brakes responsive to swinging of the tongue to an upright position or when the tongue is dropped to the ground. None, however, of which applicant is aware, discloses brakes arranged for inertial application through rearward movement of the tongue while the wagon or trailer is coupled to a tractor or preceding trailer.

SUMMARY OF THE INVENTION

The invention provides for automatic actuation of the brakes on a trailer of the baggage-truck type when the tongue is lifted from the normal pulling position, when the tongue is dropped and when the preceding tractor or trailer reduces speed suddenly, causing rearward movement of the tongue with respect to the trailer itself.

BRIEF DESCRIPTION OF THE DRAWINGS

FIG. 2 is a fragmentary enlarged top view of the front axle assembly and tongue partially sectionalized along line 2—2 of FIG. 3 to show the brake construction.

FIGS. 3–6 are enlarged longitudinal vertical sectional views along line 3—3 of FIG. 2 showing the tongue in horizontal draft, dropped, raised, and horizontal stopped positions.

DESCRIPTION OF THE PREFERRED EMBODIMENT

Figure 1:
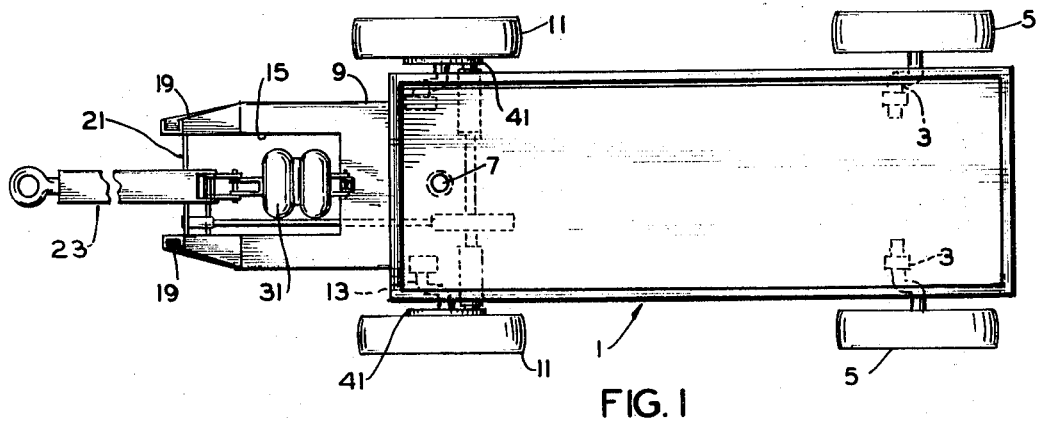
FIG. 1 is a top view of a trailer embodying the invention.

The numeral 1 generally indicates the box-like body of a trailer or baggage cart supported at its rear end on cranked stub axles 3, on which are journaled wheels 5. At its forward end, to provide for steering, body 1 is supported at its center by means of a turntable 7 on a swivel axle assembly comprising a horizontal plate-like frame 9 spring-supported on front wheels 11 by torsion-sprung cranked axles 13.

The forward portion of frame plate 9 is centrally recessed as at 15 to form a pair of transversely spaced forwardly extending arms 17, 17 the forward ends of which are inclined upwardly as at 19, 19 and which in their forward end portions mount a transverse rod or pin 21.

Longitudinally extending tongue 23 is of box section and is longitudinally slotted at its rear end at 25 to permit the passage therethrough of rod 21, the latter pivotally abutting the rear semicircular end of slot 25 when draft forces are applied to tongue 23, so as to pull the front axle assembly in the direction of draft. Rearwardly of slot 25 in tongue 23, the tongue is provided with a rearwardly and downwardly extending projection 27 which at its rear extremity is pivotally secured to bracket structure 29 on the forward face of a longitudinally extending air cushion 31, which mounts a similar bracket 33 on its rear face for pivotal connection at 35 to upstanding bracket structure 37 rigidly mounted on frame plate 9 immediately rearwardly of recess 15 therein. It will thus be evident that air cushion 31 will bias tongue 23 forwardly, normally maintaining the rear end of slot 25 in pivotally abutting relation with fulcrum rod 21, yet the pivotal connections of air cushion 31 to tongue 23 and frame bracket 37 will permit vertical pivoting movements of tongue 23 about fulcrum rod 21 and the yieldability of cushion 31 will permit the tongue to move rearwardly until the forward semicircular end of slot 25 pivotally abuts rod 21.

At its lowest extremity, rearwardly of the rear end of and at a lower level than slot 25, but forwardly of pivot 28, tongue projection 27 mounts a transversely extending pin 39 for operatively connecting the tongue to the brake mechanism.

Wheels 11 mount a brake disc 41, and transversely extending cylinders 43 carried by frame 9 mount brake shoes 45 operatively connected to plunger-type followers 47 slidably mounted within cylinder 43 and biased inwardly thereof by a spring 49, the inward end of follower 47 being of semispherical shape and projecting transversely inwardly of the axle assembly from the end of cylinders 43.

Slightly inwardly of the inner end of left hand cylinder 43, a longitudinally extending cylinder 50 is mounted on the underside of frame plate 9 and slidably mounts within it a longitudinally extending cylindrical cam 51 the central portion 53 of which is of substantially less diameter than the end portions and is connected to the end portions by outwardly sloping frusto-conical portions 54 of gradually increasing diameter, the minimum diameter central portion 53 normally being in transverse alignment with the axis of followers 47, and cylinder 50 being transversely apertured at this point to permit the projection thereinto of the semispherical inner ends of followers 47, which is normally biased into engagement with the surface of piston 51 by spring 49, so that if piston 51 moves longitudinally in either direction from its normal centered position, followers 47 will be forced transversely outwardly against the pressure of spring 49 to cause shoes 45 to engage disc 41 and thus brake the vehicle.

For actuating cam 51 a longitudinally extending link 55 is pivoted to the forward end of cam 51 on a transverse axis at 57 and the forward end of link 55 is axially slotted as at 59 to receive transverse pin 39 on the rear end of tongue 23, pin 39 normally being journaled against the rear surface of slot 59.

Figure 5:
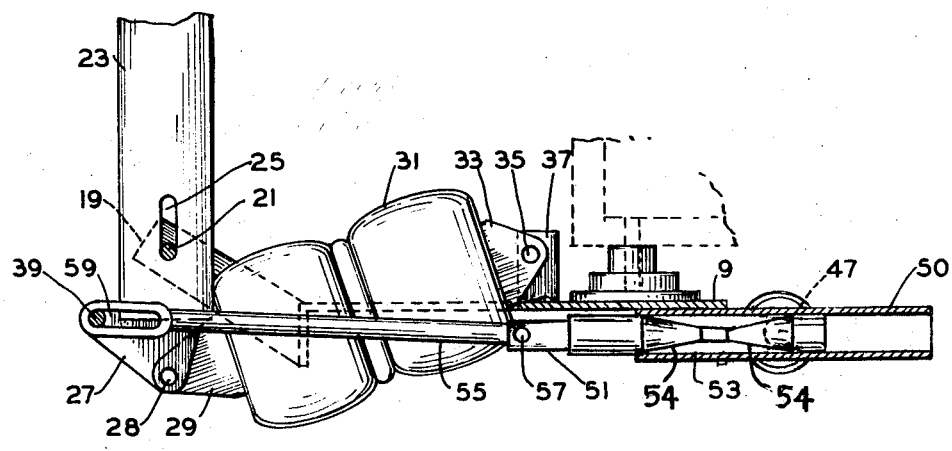

The purpose of slot 59 is to permit some limited upward tilting of tongue 23 above fulcrum rod 21 without any resultant movement of cam 51, and to provide that when the limit of upward movement permitted by slot 59 is reached and pin 39 engages the forward end of slot 59 any further movement upwardly of tongue 23, as seen in FIG. 5, will pull link 55 and, with it, cam 51 forwardly, thereby causing the enlarging rearward frusto-conical surfaces of cam 51 to push follower 47 and, with it, brake shoe 45 outwardly against brake disc 41 to brake the vehicle. It will be noted that air cushion 31 will act as a counterbalance on the tongue when the operator raises the tongue, thus aiding him in this operation.

Figure 6:
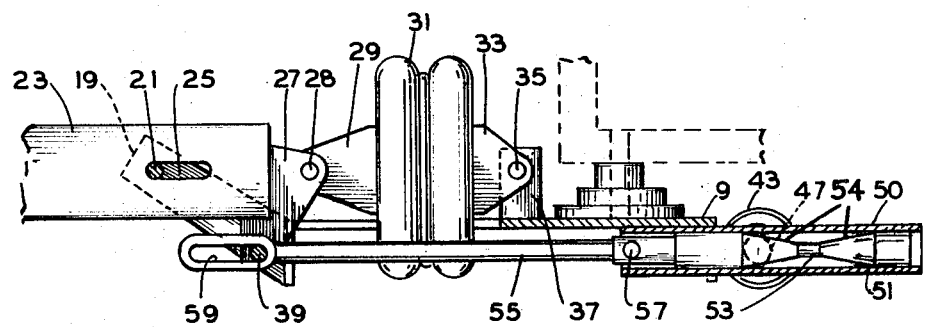

The purpose of slot 25 in tongue 23 is to provide for inertial braking, that is, when the movement of the preceding vehicle is rapidly decelerated, tongue 23 will be free to move rearwardly, compressing pneumatic cushion 31, until the forward end of slot 25 engages fulcrum rod 21. Pin 39 will then engage the rear end of slot 39 and will force link 55 and, with it, cam 51, rearwardly, to the position shown in FIG. 6, causing the forward conical surface of cam 51 to engage follower 47, thereby urging brake shoe 45 against disc 41, thus braking the vehicle.

In the event the tongue drops, as if for example the coupling with the preceding vehicle should break and the tongue drop to the ground, as shown in FIG. 4, the rear end of tongue 23 would move counterclockwise so that pin 39 would move rearwardly and upwardly, thus pushing link 55 and, with it, cam 51, rearwardly, causing the frusto-conical surface of the cam forwardly of reduced portion 53 to force follower 47 transversely outwardly and causing brake shoe 45 to engage disc 41 and brake the vehicle.

When the tongue returns from its elevated position (FIG. 5), its rearward position (FIG. 6), or its dropped position (FIG. 4), to its normal position, as shown in FIGS. 2 and 3, the transverse force, exerted by spring 49 through followers 47 on the conical surfaces 54 of cam 51 will produce a resultant force longitudinally of the cam, returning the cam to centered position, as shown in FIGS. 2 and 3, thus relieving pressure of springs 49 on brake shoes 45 and releasing the brakes.

The actuating means disclosed herein may be utilized with various types of brakes other than the disclosed disc brakes and details of the disclosed arrangement may be modified substantially without departing from the spirit of the invention.

I claim:

1. A trailer brake actuating system comprising structure supported by the trailer wheels, a draft tongue connected to said structure for pivotal movement on a transverse axis and limited longitudinal movement with respect thereto, means resiliently biasing said draft tongue to its forwardmost position on said structure, longitudinally movable cam means supported by said structure and having a depression with sloping end surfaces intermediate its ends, linkage means connecting said cam means to said tongue for translating the former responsive to movements of said tongue away from its normal draft position, means pivotally connecting said linkage means at one end to said tongue on an axis radially offset from the transverse axis of said tongue connection to said structure for movement longitudinally directly responsive to rearward or dropping movement of said tongue from its normal draft position, said connecting means including a lost motion effective during initial upward movement of said tongue from its normal draft position, a transversely movable follower engaging said tongue means in registry with the depression therein when said tongue is at its normal height for draft and in its forwardmost position with respect to said structure, said cam means being movable rearwardly responsive to relative rearward movement of said tongue, as upon deceleration of said tongue, and responsive to dropping of the forward end of said tongue below its normal draft height, said cam means being movable forwardly from its centered position responsive to raising of said tongue to a substantially vertical position, said follower being urged outwardly along a sloping end surface of said cam depression and being operatively connected to the trailer brakes to actuate the same when said follower is out of said cam depression.

2. A trailer brake system according to claim 1 wherein said linkage means is secured at its rear end to said cam means and said lost motion comprises a longitudinally extending slot at its forward end, said pivotal connecting means comprising a transverse pin on said tongue offset radially of said tongue pivot axis, said pin extending into said slot and being positioned in the rear end thereof when said tongue is in its normal draft position.

3. A trailer brake actuating system according to claim 2 wherein said resiliently biasing means comprises a longitudinal spring device pivotally connected at its rear end to said wheel-supported structure and at its front end to said draft tongue a substantial distance rearwardly of and in substantially horizontal alignment with the transverse pivot axis thereof.

4. A trailer brake actuating system according to claim 3 including resilient means biasing said follower into engagement with said cam means.

5. A trailer brake actuating system according to claim 4 wherein said link means is pivotally connected to the forward end of said cam means.

6. A trailer brake actuating system according to claim 5 wherein said wheel-supported structure comprises a frame mounting a turntable swivelly supporting the forward end of the trailer body.

7. A trailer brake actuating system according to claim 6 wherein said frame is recessed forwardly of said turntable to form a pair of transversely spaced forwardly extending arms, said arms mounting a transverse pivot pin and said draft tongue being formed with a longitudinal slot, said transverse pivot pin passing through said slot in abutting relation with the rear end thereof when said draft tongue is in its horizontal draft position.

8. A trailer brake actuating system according to claim 7 wherein said resiliently biasing means comprises a longitudinally extending spring device occupying the recess in said frame.

9. A trailer brake system including an actuating system according to claim 8, brake discs on the trailer wheels, transversely movable friction shoes engageable with said discs to effect braking of said wheels, and means connecting said shoes to said followers for forcing said shoes into engagement with said discs when said followers are urged transversely outwardly by said cam means.

References Cited

UNITED STATES PATENTS 2,040,728  5/1936  Bulmer _____ 188—119 X
3,134,461  5/1964  Klemm et al. _____ 188—119

FOREIGN PATENTS 838,113  5/1952  Germany.

GEORGE E. A. HALVOSA, Primary Examiner

U.S. Cl. X.R.

188—112